United States Patent Office 3,575,797
Patented Apr. 20, 1971

3,575,797
METHOD OF RECOVERING FIBERS AND FILLERS FROM WASTE WATER OF PAPER MACHINES WHEREIN USE IS MADE OF AN ETHER REACTION PRODUCT COMPRISING A POLYAMINE AND A DERIVATIVE OF A POLYOL HAVING AT LEAST TWO CHLOROFORMIC ACID ESTER GROUPS
Wolfgang Lehmann, Leverkusen, Heinz Ziemann, Leichlingen, and Hermann Tretter, Leverkusen, Germany, assignors to Farbenfabriken Bayer Aktiengesellschaft, Leverkusen, Germany
No Drawing. Filed Apr. 25, 1967, Ser. No. 633,383
Claims priority, application Germany, Apr. 30, 1966, F 49,081
Int. Cl. D21f 1/66
U.S. Cl. 162—189                                7 Claims

ABSTRACT OF THE DISCLOSURE

A flotation agent and method for recovering fibers or fillers from waste water by admixing a flotation agent consisting essentially of the amino groups and ether groups-containing product of a molecular weight of at least 2000 obtained by reacting a polyfunctional derivative of a polyol with an amine, which is at least bifunctional with regard to the polyfunctional derivative of the polyol, at least one of the reaction components containing at least one ether group, or a quaternization product thereof; agitating and separating the resulting froth from the waste water.

---

It has been found that ethers which contain amino groups and have a molecular weight of at least 2000, preferably at least 5000, or their quaternisation products can be used with good results as flotation agents for the recovery of fibers and fillers from the waste water of paper machines.

The ethers containing amino groups include, in particular, those compounds which can be obtained by the reaction of polyfunctional derivatives of polyols with amines, at least one of the components containing one or more ether groups.

Suitable polyols are, for example, ethylene glycol, glycerol, trimethylol-propane, hexanetriol, pentaerythritol, sorbitol and, in particular, the hydroxyl group-containing reaction products of 1 to 50 moles of alkylene oxides, such as ethylene oxide and/or propylene oxide, with 1 mole of such polyols or of other compounds containing at least two active hydrogen atoms, for example, primary amines or polycarboxylic acids.

The polyfunctional derivatives of polyols comprise those derivatives which contain at least two identical or different groupings capable of reacting with amino groups. Examples of polyol derivatives are the esters of hydrohalic acids, alkyl- and aryl-sulphonic acids or chloroformic acid and the semiesters of sulphuric acid; polyol derivatives which contain epoxy and/or chlorohydrin groups are also suitable.

Amines on which the flotation agents according to the invention can be based are, for example, those of the formula

  (I)

wherein $R_1$ means an organic radical, $R_2$ stands for hydrogen, an alkyl-, hydroxyalkyl-, cyanoalkyl- or carbamidoalkyl group and $q$ is an integer of at least 2.

Suitable representatives of the Formula I are for example: 1,4-diaminocyclohexane, 1,4-diamino-2-hydroxypropane as well as $H_2N—CH_2CH_2NHCO(CH_2)_5NH_2$.

Further suitable amines are, for example, those of the formula

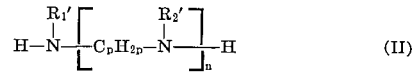  (II)

in which $p$ is an integer of at least 2, $n$ is an integer of at least 1, $R_1'$ stands for hydrogen or a substituent, especially for an alkyl, cyanoalkyl, carbamidoalkyl, hydroxyalkyl or polyalkylene oxide radical, for example, a methyl, ethyl, butyl, cyanoethyl, carbamido-ethyl, hydroxyethyl or polyethylene oxide radical, and $R_2'$, independently of $R_1'$, denotes hydrogen or a substituent, particularly a substituent of the type mentioned for $R_1'$; in the case where $q$ is an integer of at least 2, the radicals $R_2'$ may be different. Suitable representatives of the Formula II are, for example, ethylene-diamine, N,N-dimethylethylene-diamine, N-(2-cyanoethyl)-ethylene-diamine, N-(2-carbamidoethyl)-ethylene-diamine, N-(2-hydroxyethyl)-ethylene-diamine, propylene-diamine, tetramethylene-diamine, hexamethylene-diamine, diethylene-triamine, triethylene-tetramine, tetraethylene-pentamine, pentaethylene-hexamine, dipropylene-triamine and bis-(γ-aminopropyl)-methylamine.

The amines on which the flotation agents of the present invention can be based also include compounds of the formula

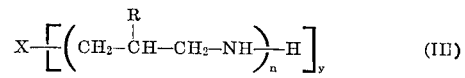  (III)

in which X stands for oxygen, sulphur or the polyvalent radical of an at least bivalent aliphatic, cycloaliphatic, aromatic or heterocyclic hydroxyl and/or sulphohydryl compound, $R_3$ denotes hydrogen or a methyl group, $n$ is an integer of at least 1 and $y$ is a number corresponding to the valency of the symbol X. Suitable representatives of the Formula III, are for example, bis-(3-aminopropyl)-ether, bis-(3-aminopropyl)-sulphide, 1,2-bis-(3-aminopoxy)-ethane, 1,4-bis-(3-aminopropoxy)-butane, 1,2-bis-(3-aminopropylthio)-ethane, bis-(3-aminopropoxy)-neopentane, tris-(3-aminopropoxy)-neopentane, 1,2,3-tris-(3-aminopropoxy)-propane and 1,4-bis-(3-aminopropoxy)-benzene.

Other example of amines on which the flotation agents according to the invention may be based are N,N'-bis-(3-aminopropyl) - hexamethylene-diamine, di-propylene-(1, 2)-triamine, tri-propylene-1,2)-tetramine, piperazine, N-aminoethyl-piperazine and N,N'-bis-(3-aminopropyl)-piperazine.

The ratio of ether groups to amino groups in the flotation agents of the present invention may vary within wide limits; an excess of ether groups has generally proved to be advantageous. The flotation agents may still contain reactive groups of both components or also of only one of the two components; this can easily be achieved in known manner by a suitable choice of the proportions between the reaction components and of the reaction conditions. Particulars can be seen from the examples.

Those flotation agents have proved to be especially satisfactory, which have been obtained by reacting amines with water-soluble polyfunctional derivatives of polyethylene glycols which contain chlorohydrin and/or glycidyl groups or which are chloroformic acid esters.

The production of flotation agents by reacting amines with those water-soluble polyfunctional derivatives of polyethylene glycols which contain chlorohydrin and/or glycidyl groups is expediently carried out according to the following instruction:

The reaction components are reacted with one another in a diluent, advantageously in water, at temperatures between 20 and 80° C. and at a pH value of 7 to 12; it is expedient to start the reaction at a concentration of about 50% and, when a viscosity of 50 to 300 cp. has been reached, to continue it while lowering the concentration to about 20 to 10%. The reaction is then interrupted in a 20% solution at a viscosity of 10 to 300 cp. and in a 10% solution at a viscosity of 3 to 200 cp., by adjusting the pH value of the reaction solution to about 2–7 by the addition of organic or inorganic acids.

The production of flotation agents by reacting amines with those water-soluble polyfunctional derivatives of polyethylene glycols which are chloroformic acid esters is advantageously carried out by the process of German patent specification (patent application F 46,754 IVd/39c (Le A 9553) of July 30, 1965) according to the following instruction:

Aqueous solutions of polyalkylene polyamines are gradually mixed at 0 to 15° C., while stirring, with water-soluble polyethylene glycol-chloroformic acid esters or solutions thereof in water-miscible organic solvents, until the reaction solutions have the desired viscosity. If necessary, agents binding hydrochloric acid are simultaneously added in order to prevent the pH value from falling below 7 during the reaction. The amounts of solvents, preferably water, are so proportioned that the solutions contain 10 to 20 percent by weight of the resultant reaction products.

The quaternisation products of ethers containing amino groups can be obtained in the usual manner by reacting the amino group-containing ethers with quaternising agents, such as dimethyl sulphate, methyl iodide or benzyl chloride.

The amounts of flotation agents which are expediently used must be chosen in accordance with the composition of the waste water of the paper machines; they can easily be established in each case by preliminary experiments. In general, amounts of 0.01 to 1 g. of amino group-containing ethers per cu. m. of waste liquor prove to be sufficient. These amino group-containing ethers whose 10% aqueous solutions have a viscosity of at least 10 cp. at 25° C. are preferred; this viscosity corresponds to a mean molecular weight of the amino group-containing ethers of at least 10,000. As a rule, the flotation effect is the greater, the higher is the viscosity of the 10% aqueous solution of the amino group-containing ether.

The flotation agents of the present invention are surprisingly effective, even in the cold season. Their effect is largely independent of the pH value of the waste water and of the type of fibres and fillers in the waste water; it is also noteworthy that the clarifying effect is virtually insensitive to overdosing. The hitherto known flotation agents do not have these advantages to the same extent.

EXAMPLE 1

To the waste water of a paper machine, which is obtained with a pH value of 7 in the processing of waste paper to produce packing paper, there is added the 10% aqueous solution of a flotation agent according to the invention described below, in an amount of 2 g./cu. m. of waste water. An excellent flotation effect is achieved.

The 10% aqueous solution used above was prepared as follows:

552 grams of a polyglycidyl ether formed from 1 mole trimethylol-propane, 25 moles ethylene oxide and 3 moles epichlorohydrin and having an epoxide equivalent of 552, were dissolved in 1100 ml. of water, and a solution of 145 g. pentaethylene-hexamine (0.625 mole) in 750 ml. of water was introduced into this solution at 25° C. in the course of 15 minutes, while stirring and cooling. The reaction mixture was subsequently stirred at 25° C. until the viscosity had increased to 50 cp. This was the case about 50 minutes after the addition of the pentaethylene-hexamine solution was completed. 1100 millilitres of water were then added whereupon the viscosity fell to about 20 cp./25° C. When the viscosity had again reached a value of 50 cp./25° C., i.e. after about 70 minutes, another 1100 ml. of water were added, whereupon the viscosity fell to about 30 cp./25° C. When the viscosity had again risen to 50 cp./25° C., i.e. after about 60 minutes, 1100 ml. of water were again added whereupon the viscosity fell to about 35 cp./25° C. When the viscosity had risen to 240 cp./25° C., i.e. after about 3 hours, the reaction was interrupted by the addition of 300 g. of glacial acetic acid and 823 g. of water. The 10% solution thus prepared had a pH value of 5 and a viscosity of 70 cp./25° C.

The same flotation effect is achieved when the aqueous solution described above is replaced with a 10% solution of a reaction product prepared in analogous manner from 552 g. of the polyglycidyl ether mentioned above and 51.5 g. diethylenetriamine (0.5 mole).

EXAMPLE 2

In the production of sized packing paper (raw material 100% Schrenz), there is added to the alum-containing waste water which has a pH value of 4.5, before a flotation pulp saver (system Sveen-Pedersen), the 10% aqueous solution of a flotation agent according to the invention described below, in a quantity of 8 g./cu. m. of waste water. The flotation effect thus achieved is very good.

The 10% aqueous solution used above was prepared as follows:

310 grams of a polyglycidyl ether which was prepared from 1 mole trimethylol-propane, 10 moles ethylene oxide and 3 moles epichlorohydrin and had an epoxide equivalent of 310, were dissolved in 620 ml. of water, and a solution of 116 g. pentaethylene-hexamine in 550 ml. of water was then introduced into this solution at 25° C. in the course of 10 minutes, while stirring and cooling. The reaction solution was subsequently stirred at 25° C. until, after the addition of three portions of 700 ml. of water which were added as described below, the viscosity of the solution had risen to 100 cp./25° C. The solution was then mixed with 230 g. of glacial acetic acid and 334 g. of water. The 10% solution thus prepared had a pH value of 5 and a viscosity of 80 cp. /25°C.

The above 2100 ml. of water were added as follows (at 60 cp./25° C.):

1st addition of 700 ml. of water—about 40 minutes after completion of addition of pentaethylene-hexamine, decrease of viscosity to about 25 cp./25° C.
2nd addition of 700 ml. of water—about 15 minutes after 1st addition of water, decrease of viscosity to about 35 cp./25° C.
3rd addition of 700 ml. of water—about 10 minutes after 2nd addition of water; decrease of viscosity to about 45 cp./25° C.

The same flotation effect is achieved when the aqueous solution described above is replaced with the 10% solutions of reaction products prepared in an analogous manner from 310 g. of the polyglycidyl ether mentioned above and 51.5 g. diethylene-triamine, 73 g. triethylene-tetramine, 66 g. γ,γ'-diamino-dipropylether, 45 g. 1,3-diamino-2-hydroxypropane, 57 g. 1,4-diamino-cyclohexane and 94.5 g. tetraethylene-pentamine, respectively.

EXAMPLE 3

To the waste water obtained in the production of cellucotton from bleached sulphite and sulphate cellulose, there is added before a flotation pulp saver (system Adka, open construction) the 10% aqueous solution of a flotation agent according to the invention described below, in an amount of 2 g./cu. m. of waste water. Sudden increases of the load which occur through breaking of the paper web are compensated without necessitating an increased addition. The solids content of the clarified waste water amounts to 50–60 mg. per litre.

The 10% aqueous solution used above was prepared in the following manner:

580 grams octaethylene glycol-bis-chloroformic acid ester (1.17 mole) were added dropwise within one hour, with vigorous stirring, to a solution of 103 g. diethylene-triamine (1.0 mole) in 4900 ml. of water. During this operation, the temperature of the reaction mixture was kept between 5 and 10° C. by cooling, and the solution was adjusted to a pH value >7 by the addition of 120 g. sodium carbonate in 277 ml. of water. The 10% solution so obtained had a viscosity of 60 cp./25° C.

The same flotation effect is achieved when the aqueous solution described above is replaced with a 10% solution of the reaction product obtained in analogous manner from 650 g. tridecaethylene glycol-bis-chloroformic acid ester and 103 g. diethylene-triamine.

If the reaction products described above are replaced with a product prepared from 0.878 mole epichlorohydrin and 1 mole γ,γ'-diaminopropyl-methylamine in the form of a 10% aqueous solution with a viscosity of 60 cp./25° C., or with polyethylene-imine, or with a basic polyamide prepared from diethylene-triamine and adipic acid, then larger amounts must be used.

EXAMPLE 4

To the waste water obtained in the production of sized or unsized weighted packing paper (raw material waste paper) and having a pH value of 4.5–4.8 and 7.0–7.3, respectively, there is added before the flotation pulp saver the 10% aqueous solution of a flotation agent according to the invention described below, in an amount of 2 g./cu. m. of waste water. An excellent clarification is achieved in both cases, and the solids content of the waste water is reduced from 1600 ml./litre to 15–20 mg./litre.

The 10% aqueous solution used above was prepared in the following manner:

A melt of 1710 g. (1.05 mole) of the bis-chloroformic acid ester of a polyethylene glycol of molecular weight 1500 was added dropwise at 5–10° C. within one hour, with vigorous stirring, to a solution of 146 g. triethylene-tetramine (1 mole) in 15 144 ml. of water. When the addition was completed, the 10% solution so obtained had a viscosity of 300 cp./25° C. and a pH value of 4.

The same result is obtained by using a 10% aqueous solution prepared as described above from 1710 g. (1.05 mole) of the bis-chloroformic acid ester of a polyethylene glycol having a molecular weight of 1500 and 305 g. tris-(3-aminopropoxy)-neopentane or 129 g. N-2-amino-ethyl-piperazine.

EXAMPLE 5

To the waste water of a paper machine in which writing paper with an ash content of 8% is produced with the addition of optical brightening agents, the 10% aqueous solution of the reaction product obtained from octaethylene-glycol-bis-chloroformic acid ester and di-ethylene-triamine described in Example 3 is added in the waste water collector in an amount of 4 g./cu. m. of waste water. The waste water thus treated is then passed into a recovery device (system Adka Super or Krofta). The flotation effect thus achieved is very good. It is noteworthy that paper which is produced with the use of the recovered fibres and fillers exhibits no extinction of fluorescence.

What is claimed:

1. A method for recovering fibers or fillers from waste water of paper machines comprising adding an active amount of a flotation agent to said waste water, said floatation agent comprising an ether reaction product having a molecular weight of at least 2000, the reactants thereof consisting of (A) polyamine of the formula $$H-N\begin{matrix}R'_1\\|\\\phantom{N}\end{matrix}\left[-C_pH_{2p}-N\begin{matrix}R'_2\\|\\\phantom{N}\end{matrix}\right]_a-H$$

$$X\left[-\left(CH_2-\overset{R_3}{\underset{|}{C}H}-CH_2-NH\right)_n-H\right]_y$$

wherein
 p is an integer of at least 2;
 n is an integer of at least 1;
 $R_1'$ and $R_2'$ are individually defined as a hydrogen, alkyl, cyanoalkyl, carbamidoalkyl, hydroxy-alkyl or polyalkylene oxide;
 X is a member selected from the group consisting of oxygen, sulfur, and a polyvalent radial of an at least bivalent aliphatic, cycloaliphatic, aromatic, heterocyclic hydroxyl compound or sulfohydryl compound;
 $R_3$ is hydrogen or methyl; and
 y is a number corresponding to the valency of X; and (B) a derivative of a polyol having at least two chloroformic acid ester groups or the corresponding quaternization product thereof; at least one of said (A) and (B) reactants containing an ether group; agitating said waste water and flotation agents and separating the fibers or fillers from said waste water.

2. The method of claim 1 wherein the polyamine reactant is a polyalkyl polyamine of the formula $$H-N\begin{matrix}R'_1\\|\\\phantom{N}\end{matrix}\left[-C_pH_{2p}-N\begin{matrix}R'_2\\|\\\phantom{N}\end{matrix}\right]_a-H$$

3. The method of claim 2 wherein the (B) component is said derivative of a polyol having at least two chloroformic acid ester groups.

4. The method of claim 3 wherein the (B) component is bis-chloroformic acid ester of polyethylene oxide having at least eight ethylene oxide units.

5. The method of claim 1 wherein the polyamine reactant is a compound of the formula $$X\left[-\left(CH_2-\overset{R_3}{\underset{|}{C}H}-CH_2-NH\right)_n-H\right]_y$$

6. The method of claim 5 wherein the (B) component is said derivative of a polyol having at least two chloroformic acid ester groups.

7. The method of claim 6 wherein the (B) component is bis-chloroformic acid ester of polyethylene oxide having at least eight ethylene oxide units.

References Cited

UNITED STATES PATENTS

| | | | |
|---|---|---|---|
| 2,817,602 | 12/1957 | Pardo | 260—29.2X |
| 3,251,852 | 5/1966 | Groote et al. | 260—29.2X |
| 3,346,519 | 10/1967 | Williams | 260—29.2X |
| 3,347,803 | 10/1967 | Frotscher et al. | 260—ZEPOX |
| 3,349,053 | 10/1967 | Ashby | 252—60X |

S. LEON BASHORE, Primary Examiner

F. FREI, Assistant Examiner

U.S. Cl. X.R.

162—190; 210—44; 260—2, 17.4